United States Patent [19]

Kuhlmann et al.

[11] Patent Number: 4,511,419
[45] Date of Patent: Apr. 16, 1985

[54] METHOD AND DEVICE FOR LAMINATING FOILS

[75] Inventors: Heinz Kuhlmann, Wiehl; Eckhard Prinz, Hamburg, both of Fed. Rep. of Germany

[73] Assignees: Firma Erwin Kampf GmbH & Co.; Firma Softal GmbH, both of Fed. Rep. of Germany

[21] Appl. No.: 550,509
[22] Filed: Nov. 10, 1983

Related U.S. Application Data

[63] Continuation-in-part of Ser. No. 371,281, Apr. 23, 1982, abandoned.

[51] Int. Cl.³ .............................................. B29C 19/02
[52] U.S. Cl. .............................. 156/272.6; 156/273.3; 156/274.6; 156/379.7; 156/379.9; 156/380.3; 156/380.9; 156/382; 264/22
[58] Field of Search ............... 156/272.2, 272.6, 273.3, 156/274.6, 244.17, 379.7, 379.9, 380.3, 380.9, 382; 264/22, 25

[56] References Cited

U.S. PATENT DOCUMENTS

| 3,329,549 | 7/1967 | Vilutis | 156/273.1 |
| 3,477,902 | 11/1969 | Tomasino et al. | 156/272.6 |
| 3,647,592 | 3/1972 | Woodberry | 156/285 |
| 3,823,061 | 7/1974 | Frayer et al. | 156/244.17 |
| 3,959,104 | 2/1976 | Fales | 204/164 |

FOREIGN PATENT DOCUMENTS

| 1089154 | 9/1960 | Fed. Rep. of Germany . |
| 1222241 | 8/1966 | Fed. Rep. of Germany ... 156/273.3 |
| 2362267 | 7/1974 | Fed. Rep. of Germany . |
| 2446414 | 9/1975 | Fed. Rep. of Germany . |
| 3129997 | 4/1982 | Fed. Rep. of Germany . |
| 3124280 | 5/1982 | Fed. Rep. of Germany . |

Primary Examiner—Jay H. Woo
Assistant Examiner—Timothy W. Heitbrink
Attorney, Agent, or Firm—Bacon & Thomas

[57] ABSTRACT

A device for laminating two different foils in vacuo with the aid of an electrical gas discharge has two separate treatment chambers or areas, in which different vacuo can be set, so that the treatment can be adjusted in accordance with the corresponding foil, i.e. it can be performed in an optimum manner in accordance with the physical and chemical characteristics of the foil. The electrical gas discharge is a plasma discharge, i.e. a low energy gas discharge in vacuo. Advantageously, the electrodes can be operated at different power levels in the individual, separate treatment areas. For adapting the atmosphere in the treatment areas to the foil characteristics, it is also possible to introduce different gases and optionally carry out an additional heat treatment.

32 Claims, 2 Drawing Figures

METHOD AND DEVICE FOR LAMINATING FOILS

This application is a continuation-in-part, of application Ser. No. 371,281, filed Apr. 23, 1982 abandoned.

BACKGROUND OF THE INVENTION

1. Field of the Invention

The invention relates to a method of laminating at least two foils such as plastic foils, metal foils and ribbons, paper, or fabric, the foils being treated with a low energy gas discharge in vacuo. Moreover, the invention relates to a device for the application of this method.

The field of the invention is laminating two or more foils without using adhesives.

2. Description of the Prior Art

Compound materials consisting of several layers, especially compound foils, are more and more used. Special properties different from those of mono foils can be achieved by selection of suitable materials. A main field of application of compound materials is packaging technology, and flexible laminated foils playing the most important role in this connection. Most foil combinations are manufactured by laminating previously manufactured mono foils.

Today we know numerous methods of bonding foils together. In particular, the following adhesives are used: waxes, thermoplastic adhesives, polymers, glues, dispersions, adhesive varnishes, and reactive adhesives. The basic materials for the production of all these laminating adhesives, except some glues, are highly refined mineral oil derivates which are produced with a high expenditure of energy.

Waxes, thermoplastic adhesives, and polymers are applied molten and undiluted, the average quantity being 15 to 20 $g/m^2$. The adherency of the compounds is sensitive to water and relatively low.

Using glues and dispersions, the applied quantity of solids is about 2.5 $g/m^2$, on an average. These adhesives must be applied diluted, the mainly used thinner being water. During the laminating process this water must be evaporated by application of process heat, thus heating the entire compound. Thereafter the compound must quickly be cooled down. It is true that with this method the consumption of adhesives is lower than with the methods mentioned before, but the toal amount of required process energy is considerably higher. The adhesive power of the compound is high and more heat-resistant. The method cannot be applied unless at least one of the materials to be laminated is highly permeable to steam.

So far the application of adhesive varnishes results in the highest adhesive power; it is possible to use adhesive varnishes with nearly all compound materials. The mainly used adhesives are heat-reactive and dissolved in organic solvents. The average consumption of adhesives is 12 $g/m^2$, the quantity of solids being 4 $g/m^2$ and the quantity of solvents being 8 $g/m^2$. These solvents must be evaporated by application of process heat. In addition, they must be removed from the waste air for reasons of air pollution control. Regarding the high energy consumption, the problems of air pollution, and the resulting higher costs of investment and operation, this method is very disadvantageous.

As for the adherency properties which can be achieved the reactive adhesives correspond to the adhesive varnishes, approximately. At present, however, the universal application of such reactive adhesives is not yet possible as the methods are still in the phase of development and introduction. The reactive adhesives are applied without using solvents and less than 2 $g/m^2$ is needed. Hereby the air pollution problems are solved and the energy consumption is largely reduced.

The treatment of foils surfaces with a corona discharge, i.e., a high frequency gas discharge under atmospheric pressure, is known from U.S. Pat. No. 3,823,061. After the treatment the surfaces are bonded together. The adhesive power of such a compound foil is, however, not completely satisfying and only a few sorts of foils can be used with this method.

The corona treatment of metallic foils such as aluminum foils is known from DAS No. 1,222,241; DAS No. 1,236,904; and DAS No. 1,241,682. The metallic surfaces treated in order to improve the adherency are subsequently either varnished, or laminated by means of adhesives, or extrusion-coated with synthetic materials such as polyethylene.

The corona treatment of non-conductive synthetic foils for the same purpose is also well known. A survey of the potential fields of application of the electric treatment of materials and surfaces is given in the article "Prospects for industrial applications of electrical discharge", Chem. Tech., April 1971, p. 232-237. This article gives, among others, a description of the above mentioned discharge treatment of plastic foils in order to improve the adherency while the foils are extrusion-coated with thin synthetic layers of polyethylene, e.g. This extrusion coating method with corona treatment already does not use any additional adhesives nor coupling agents. On the contrary, the molten synthetic layer acts as if it were an adhesive itself.

A description is also given of devices for the adhesive-free lamination after preceding electrical or corona treatment, cf e.g., U.S. Pat. Nos. 3,329,549, 3,360,412 and 3,823,061. However, these devices are generally only suitable for the treatment of a specific type of material or product and do not have completely satisfactory joining strenths.

Recently, the patent literature has referred to another method for the surface treatment of materials, the so-called "plasma treatment". This is a low energy gas discharge in vacuo, which is described inter alia in U.S. Pat. Nos. 3,477,902; 3,647,592; and 3,959,567. DOS No. 3,124,280 describes a continuous installation for the treatment of foil material. In addition, U.S. Pat. No. 3,959,567 disclosed a device for producing laminates, following a preceding plasma treatment. Compared with corona treatment and other electrical and in particular electrostatic treatments, the joining strength of the composite materials produced by lamination after plasma treatment is clearly improved, as is proved by the values in the table at the end of the description.

In summarizing, it can therefore be assumed that it is known in the corona treatment field to laminate foils, i.e., to join them together. This treatment takes place in a common chamber, cf U.S. Pat. No. 3,329,549.

It is also known to treat foils with a low energy gas discharge in vacuo, i.e., to perform a so-called plasma treatment. The known device treats a foils, without there being any direct connection to another foil, cf U.S. Pat. No. 3,477,902.

SUMMARY OF THE INVENTION

It is the object of the invention to provide a method which makes it possible to bond previously manufacturned foils without using adhesives and which yields high adhesive forces between the several layers, the method being reproducible and suitable for a multitude of material combinations.

According to the invention this object is accomplished by activating the foils to be bonded with an energy density of 10 to $10^4$ mWs/cm$^2$ and then bonding them in-line only by application of pressure and preferably heat so that the adherency between the surfaces is in the order of the cohesive power of the less coherent material.

The discharge treatment according to the invention results in active zones on the treated surface, the kind of the active zones being most different. Although the precise nature of the change which takes place is not known with certainty, it is assumed that, among others, covalent and hydrogen bonds take effect by the activation. These bonds are caused by functional groups and radicals. They effect an adhesive force between the foil surfaces.

The activation of the foils according to the invention results in a large quantity of active zones on the surface; an undesired modification of the inner structure of the material can be avoided. So the emitted energy may be fully used for producing adhesion.

The active zones are subject to ageing. In order to make full use of the absorbed energy it is therefore recommended that the laminating process should be accomplished in-line with the activating treatment.

Measurements were taken and the following specific energy densities have proved suitable for the various materials:
Low density polyethylene: 50 to 700 mWs/cm$^2$
Polypropylene: 200 to 1500 mWs/cm$^2$
Polyamide: 100 to 700 mWs/cm$^2$
Al: 200 to 1000 mWs/cm$^2$ The materials may be laminated within the vacuum chamber or outside the chamber under atmospheric pressure.

On the other hand, because of the storage effect of the activation the foils to be bonded may be treated separately and then laminated in a further step hereafter. In this case a somewhat higher energy may be required or the adhesive force may be somewhat lower.

In order to extend the field of application of the method, the discharge treatment and/or the laminating process may be accomplished in a suitable gas or vapour atmosphere.

To give an example of the application of the described method, a device having the following features is proposed:

(a) means for guiding the foils to be treated are arranged within a vacuum chamber, the means containing dischargers;

(b) the guiding means lead to a pair of laminating rollers.

This device enables the foils to be treated most practically and effectively and results in extraordinarily permanent adhesion between the bonded foils.

In particular, the electrode systems may have the form of a plane surface, a curved surface, and/or rollers.

By the application of pressure and heat the contact between the activated zones is made so close that the bonds can stretch, thus accomplishing the adhesion. That is why the laminating rollers may be pressed against each other under a pressure up to 100 N/cm.

The temperature of the laminating rollers and/or the electrodes may be varied between 350 and 600 K.

According to the invention, a separate treatment area is provided for each foil, where, with respect to the parameters influencing the treatment (particularly the vacuum level), the conditions can be set which are optimum for the corresponding foil. If, for example, an aluminum foil is laminated, i.e., joined to a plastic foil, then the vacuum and power for the aluminum foil differ from those for the plastic foil. However, it is not only possible to carry out the treatment under different vacua, but also in different atmospheres, i.e., by introducing corresponding gases.

The invention not only proposes to use the per se known plasma treatment for the momentary lamination of two foils, but the corresponding teaching is given to carry out the treatment in different treatment areas, so that each foil can be treated in an optimum manner, in accordance with its physical and chemical characteristics.

The electrode systems used in the plasma treatment chambers can be constructed with a planar surface, a curved surface, as electrode knives and/or electrode rollers and can have different power levels to one another.

It is an essential point of the present invention that the activation of the surface of the foils to be laminated can take place at different pressures, the final pressure in the two plasma treatment areas or chambers being between 0.01 and 200 mbar. As a result of the subdivision into two treatment areas, a different treatment pressure can be chosen for each foil to be laminated. It also permits the treatment of foils with different gases and/or vapours. As a function of the nature of the material to be treated, a plurality of organic and inorganic gases, as well as vapour-carrier gas mixtures can be used.

In order to increase the reactivity to the plasma treatment of the foil surfaces to be treated, it has proved that it is advantageous to heat the surfaces prior to the treatment. This takes place by heat sources, positioned in front of the electrode systems.

The plasma-treated foils are jointed by lamination in a laminating area, which is separated from the plasma treatment areas and in which a final pressure of 200 to 1000 mbar prevails. The pressure and temperature of the laminating rollers ensure that the activated centres are moved towards one another to such an extent that the bonds can spread and consequently there is an integral joint with high adhesive strength values. The laminating rollers can be pressed against one another at a pressure up to 100 N/cm. The temperature of the laminating rolllers can be regulated to between 350 and 600 K.

In order to bring the surfaces of the foils to be laminated to a temperature, which is just below the melting temperature of the lowest-melting foil component, the plasma-treated foil surfaces are heated by heat sources shortly before the actual lamination process.

According to the invention, the electrodes of each discharge space are connected to a high frequency generator, which is of the constant current type with a discharge frequency between 1 and 500 kHz. The discharge voltage is between 10 and 5000 V. The output transformer can be connected in such a way, that the central tapping is connected to ground. As a result, the counter electrodes and electrode rollers have the full voltage between them, but only half the voltage to ground. Thus, there can be no charge drain, i.e. energy loss from the electrode system to the ground. The transformer can also be connected in such a way, that the electrodes have the full voltage to ground. The generator power is selected in such a way that in correlation with the foil speed and width, it gives a specific treatment energy between 10 mWs/cm$^2$ and 10 Ws/cm$^2$. In order to avoid rejects, the preselected data are kept constant by power regulation proportional to the speed.

According to the invention, feed and take-up rollers for the foils can be arranged in the vacuum chamber, which permits batchwise (discontinuous) operation.

According to another embodiment, the feed and take-up rollers are arranged outside the chamber, in which case the foils are introduced into and removed from the vacuum chamber by using air locks. In this embodiment, it is possible to carry out the lamination inside or outside the vacuum chamber. Continuous operation is possible through the use of automatically operated rollers.

According to a third embodiment, which also has continuous operation, automatically operated reversible rollers are used. The rollers which are in operation are located in the treatment chamber. The rollers to be charged or emptied are in each case accessible by means of discontinuous vacuum antechambers.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
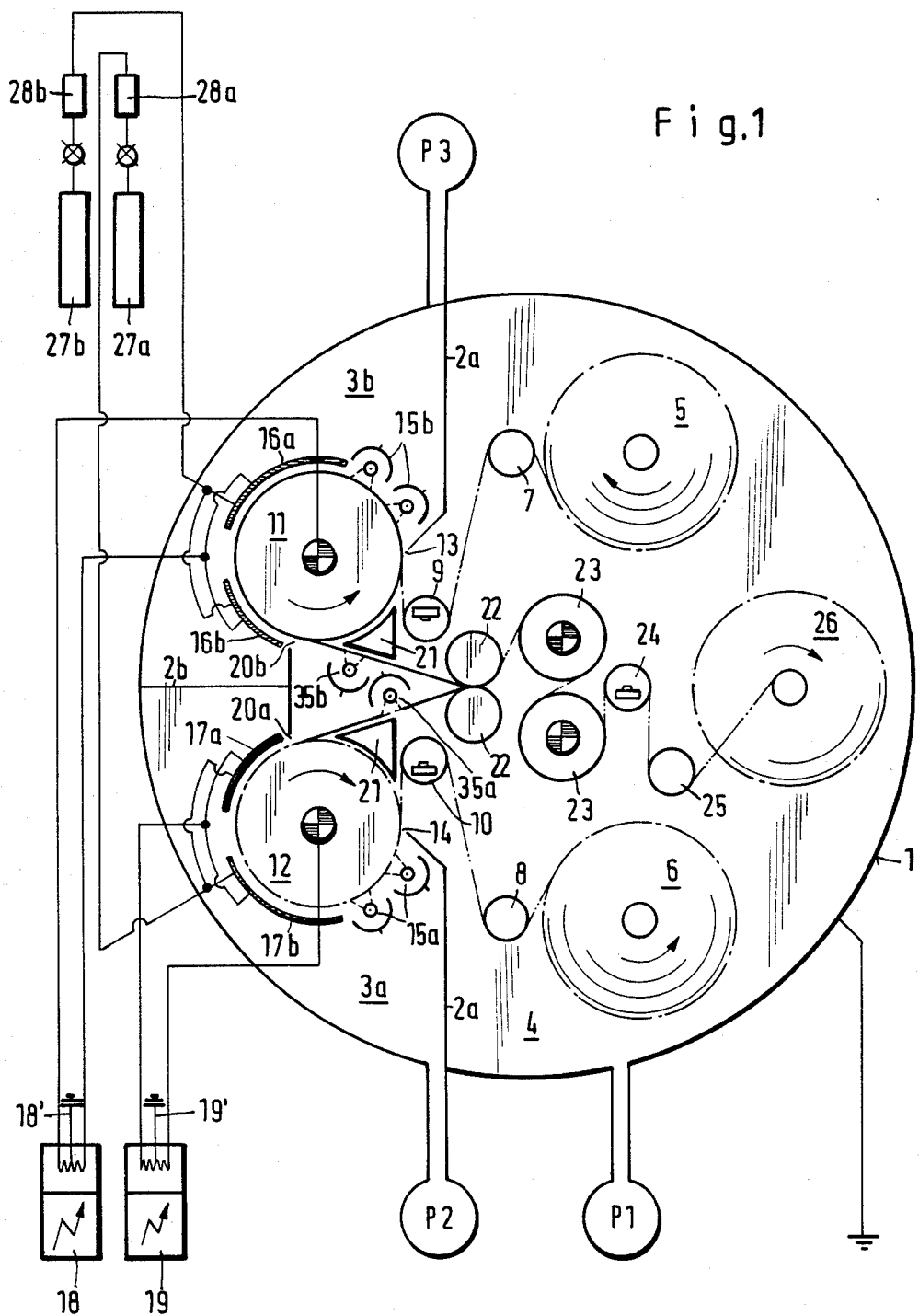
FIG. 1 a first embodiment of a device according to the invention for batchwise operation.

The device according to FIG. 1 is intended for batchwise or discontinuous operation. The complete treatment takes place in a vacuum chamber 1, which is preferably made from steel. It is provided with doors, which enable charging to take place. Chamber 1 is subdivided by partitions 2a and 2b into three subchambers 3a, 3b and 4, 3a and 3b representing plasma treatment areas and 4 a laminating area. The plasma treatment areas 3a and 3b can be evacuated by vacuum pump systems P2 and P3 to a final pressure in the range 0.01 to 100 mbar, whilst the pressure in 3a and 3b can differ. Using pump system P1, a final pressure of 100 to 1000 mbar can be produced in laminating area 4. The laminating area contains two feed rollers 5, 6, as well as guide rollers 7, 8 and tensiometer or dancing rollers 9, 10.

Electrode rollers 11, 12 are mounted in treatment areas 3a, 3b and are looped by the foils. An insertion gap 13 or 14, serving as an air lock for the insertion of foils, is in each case left free between the edges of partition 2a and electrode roller 11 or 12. As a function of the gas pressure and the type of gas used, electrode rollers 11, 12 can have different surface coatings of a dielectric material. The dielectric material is a homogeneous, non-porous coating of silicone rubber, fibre glass-reinforced plastic, polyester, plasma-sprayed ceramics, enamel or the like. The coating thickness can be up to 20 mm. It is also possible to use electrode rollers without a dielectric coating. In this case, the material to be treated serves as the dielectric material. Heating of the materials takes place by means of heat radiators 15a, 15b, which are linked with the insertion gaps 13, 14 facing the surfaces of the electrode rollers 11, 12.

Two counterelectrodes 16a, 16b or 17a, 17b in each case face a larger peripheral arc of electrode rollers 11 or 12. Electrode rollers 11 or 12 and counterelectrodes 16a, 16b or 17a, 17b are in each case connected to a high frequency generator 18, 19, whose output windings can have a central grounding 18' or 19', so that the electrodes only have half the generator output voltage to ground. It is also possible for the electrodes to ground to be at the full generator output voltage, but in this case it must be ensured that the inner walls of the discharge treatment areas are well insulated. Electrodes 16a, 16b or 17a, 17b can be both high-grade steel curved surface electrodes and aluminium electrode knives. Therefore, each of these four electrodes can have a different power level. Their size is designed in such a way that a current density of 20 mA/cm$^2$ is not exceeded, in the case of a maximum electrode power of 10 kW/m electrode width. These values also apply regarding the dimensioning of the carrier rollers. The distance between the electrodes and the carrier rollers can be up to 200 mm.

The high frequency generator is of the constant current type and has a discharge frequency in the range 1 to 500 kHz. The discharge voltage is between 10 and 5000 V. The output transformer is constructed in such a way, that the centre tapping can be connected to ground. As a result, the full voltage is applied between the counterelectrodes and the electrode rollers, but with only half the voltage to ground. As a result, there is no charge drain, i.e. energy loss between the electrode system and ground. In the case of this high frequency generator, it can also be connected in such a way that the electrodes have the full voltage to ground. The generator power is selected so that, in correlation with the foil speed and width, it gives a specific treatment energy between 10 mWs/cm$^2$ and 10 Ws/cm$^2$. In order to avoid rejects, the preselected data are kept constant by regulating the power proportional to the speed.

The complete discharge system and particularly all live parts, are insulated from the casing and are mounted in a spaced manner. If necessary, parts of the casing, or foil-carrying elements which are connected to ground are coated with dielectric materials or are made from dielectric materials, in order to prevent the undesired outflow of discharge energy.

The temperature of the curved surface electrodes or electrode knives 16a, 16b or 17a, 17b can be regulated. The temperature of the discharge system can be controlled, e.g. by circulating heat carrier oil. Radiators 15a, 15b are used for the direct heating of the surface of the foils.

Following the plasma treatment, the foils pass through gas 20a, 20b out of the discharge treatment areas 3a, 3b. The foil portion passing onto an electrode roller and the foil portion being discharged, in each case form an approximately triangular hollow space with the peripheral surface of the electrode roller. To ensure that there is no glow discharge in this hollow space and to obviate the treatment of the back of the foil, a displacement device 21 is arranged in said space. The displacement device is made from dielectric material and substantially fills the space in accordance with its contours. The distance from the surfaces and the foils must at no point exceed 10 mm.

Laminating rollers 22 are arranged within the laminating area 4 and may be heated and pressed against one another under regulated pressure. Prior to the actual laminating process, the plasma-treated foils are heated with heat radiators 35a, 35b. The foils are guided by cooling rollers 23, a dancing roller 24 and further guide rollers 25, whilst a take-up roller 26 is also provided.

The temperature of the laminating rollers can be set between 350 and 600 K and the pressure between 1 and 100 N/cm.

Finally, gas reservoirs 27a, 27b with introduction means 28a, and 28b are provided, which makes it possible to introduce gas and/or vapour, particularly into the discharge areas. Organic and inorganic gases can both be used. Preference is given to air, oxygen, nitrogen, carbon dioxide, hydrogen, argon and other inert gases, ethylene, acetone or a carrier gas-vapour mixture. Preferably, the gas is supplied to the curved surface electrodes or electrode knives and is blown by nozzles directly into the said discharge gaps. The device permits the use in discharge chambers 3a, 3b of the same gases at different pressures and flow rates, as well as different gases for both chambers. The pressure and flow rate can also be varied in the latter case. According to another variant, the gases are blown directly between the joining foils upstream of the laminating rollers.

The operation of the present device according to FIG. 1 needs no further explanation. The feed and take-up rollers can also be arranged in vacuum locks, which can be separately partitioned from the vacuum chamber 4. This permits a roller change, without removing the vacuum within the complete vacuum chamber.

Figure 2:
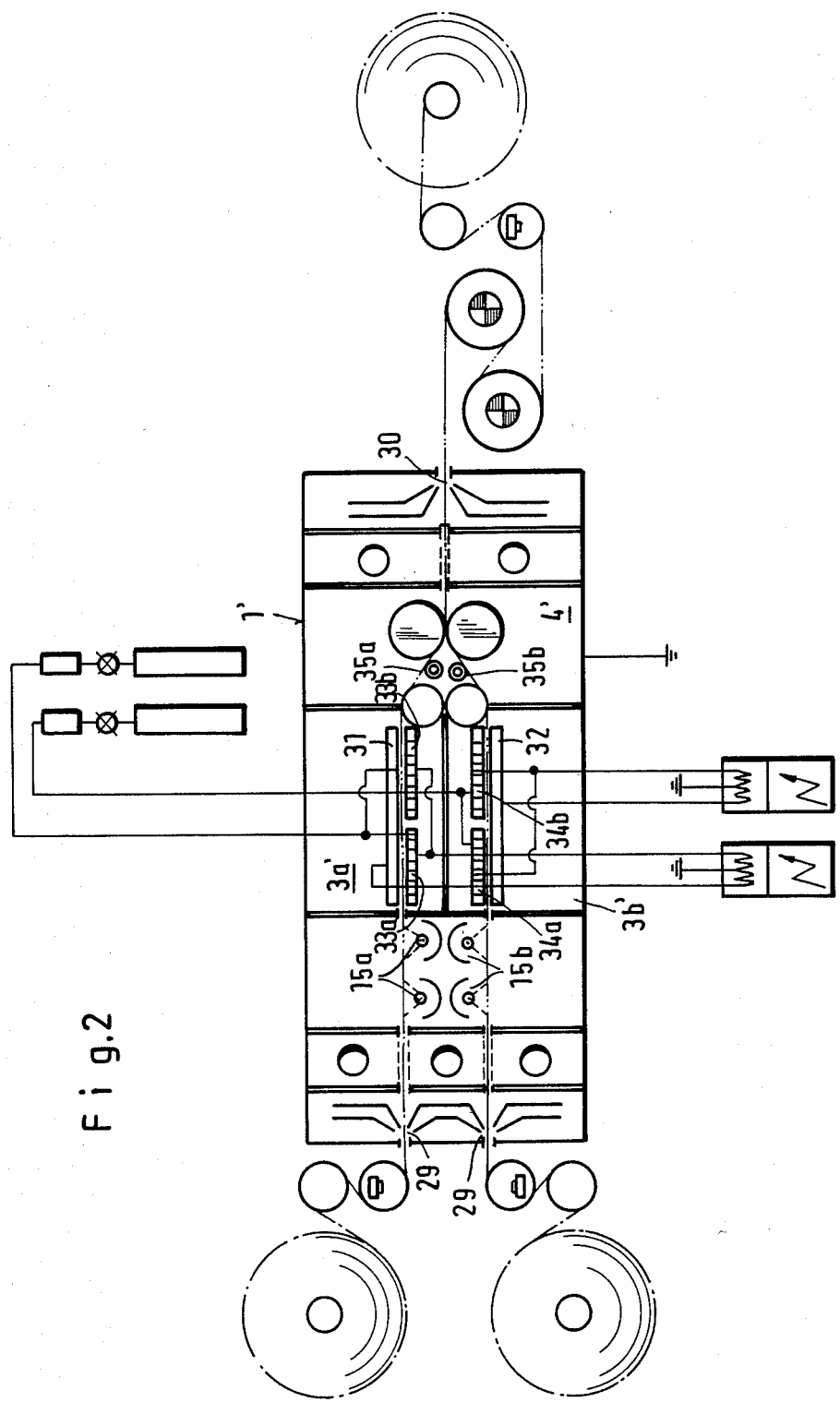
FIG. 2 a second embodiment of the invention for continuous operation.

An embodiment of the invention according to FIG. 2 shows continuous flow vacuum chamber 1'. The foils are supplied via vacuum locks 29 into the discharge treatment chambers 3'a, 3'b. The composite foil is passed out of the laminating chamber 4' by means of a vacuum lock 30. The electrode system for both foils are constructed as planar flat electrodes or electrode knives. The construction of this device otherwise corresponds to that described hereinbefore.

In each case, there is a reference electrode 31 or 32 and a counterelectrode 33a, 33b or 34a, 34b. The reference electrodes are at a smaller distance from the foil and face the foil surface which is not to be activated. However, electrodes 33a, 33b and 34a, 34b have such a considerable distance from the foil surface, that it is possible to ignite the gas discharge necessary for activation between electrodes 33a, 33b or 34a, 34b and the foil surface.

The tests performed have confirmed the effectiveness of the described device with regards to its technical usability. Certain of the values obtained are given in the following table.

| Laminate | Al-LDPE | Al-PP | PPO-LDPE | PA-LDPE |
|---|---|---|---|---|
| Gas type | $O_2$ $O_2$—$N_2$—mixture | $O_2$ $O_2$ | $O_2$ $O_2$—$N_2$—mixture | $N_2$ $O_2$—$N_2$—mixture |
| Gas pressure mbar | 1.5  0.5 | 1.5  1.0 | 1.0  0.5 | 1.0  0.5 |
| Foil width mm | 300 | 300 | 500 | 500 |
| Foil speed m/min | 30 | 30 | 60 | 60 |
| Electrode mm | 300 × 100 | 300 × 100 | 500 × 250 | 500 × 250 |
| Electrode spacing mm | 15 | 15 | 25 | 25 |
| Specific energy mWs/cm$^2$ | 400–700 | 400–700 | 600–700 | 500–700 |
| Frequency kHz | 28 | 28 | 24 | 24 |
| Dielectric material thickness mm | 0.8 | 0.8 | 0.8 | 0.8 |
| Laminating roller temp. K. | 420 | 450 | 420 | 420 |
| Laminating pressure N/cm | 20 | 20 | 15 | 15 |
| Adhesion, dry | Inseparable | Inseparable | Inseparable | Inseparable |

Al = aluminium,
LDPE = low density polyethylene,
PP = polypropylene,
PPO = oriented polypropylene,
PA = polyamide.

We claim:

1. A method of laminating at least two foils such as plastic foils, metal foils and ribbons, paper, or fabric, the foils being treated with an electrical gas discharge, comprising the steps of: (a) passing a first foil into a first treatment chamber having a first pressure; (b) passing a second foil into a second treatment chamber having a second pressure, the second treatment chamber being separate from the first treatment chamber; (c) treating the first and second foils with a low energy plasma gas discharge in vacuo in their respective treatment chambers such that the surfaces to be bonded together are activated with an energy density of 10 to $10^4$ mWs/cm$^2$; (d) passing the foils into a laminating chamber having a third pressure greater than the first or second pressures, the laminating chamber being separate from the first and second treatment chambers; (e) bringing the foils into contact; and (f) bonding the foils together under pressure and heat.

2. The method of claim 1 wherein the foils are treated with specific energy densities in the range of 50 to 1500 mWs/cm$^2$.

3. The method of claim 2 wherein at least one of the foils is a low density polyethylene and the foils are treated with energy densities in the range of 50 to 700 mWs/cm$^2$.

4. The method of claim 2 wherein at least one of the foils is a polypropylene material and the foils are treated with specific energy densities in the range of 200 to 1500 mWs/cm$^2$.

5. The method of claim 2 wherein at least one of the films is a polyamide material and the foils are treated with specific energy densities in the range of 100 to 700 mWs/cm$^2$.

6. The method of claim 2 wherein at least one of the foils is an aluminum material and the foils are treated with specific energy densities in the range of 200 to 1000 mWs/cm$^2$.

7. The method according to claim 1 wherein, subsequent to the activation of the foils, the third pressure is sub-atmospheric such that the foils are brought into contact in vacuo.

8. The method according to claim 1 wherein the pressures in the first and second treatment chambers are between 0.01 and 200 mbar.

9. The method according to claim 1 wherein the pressure in the first treatment chamber is different from the pressure in the second treatment chamber.

10. The method according to claim 1 wherein the pressure in the laminating chamber is between 200 and 1000 mbar.

11. The method according to claim 1 wherein the bonding of the foils is carried out by passing them through the nip of a pair of laminating rollers, the rollers pressing against one another at a pressure up to 100 N/cm.

12. The method according to claim 11 comprising the additional step of heating the laminating rollers to a temperature between 350° K. and 600° K.

13. The method of claim 1 wherein the first and second foils are treated by passing them between first and second pairs of electrodes, the first pair of electrodes being at a different power level than the second pair of electrodes.

14. The method of claim 13 comprising the additional step of connecting the first and second pairs of electrodes to first and second high frequency generators, respectively, such that the electrodes have only half the generator output voltage to ground.

15. The method of claim 1 wherein the first foil is treated by passing it over a first electrode roller and into proximity of first and second counterelectrodes.

16. The method of claim 15 comprising the additional step of operating the first and second counterelectrodes at different power levels.

17. The method of claim 15 wherein the second foil is treated by passing it over a second electrode roller and into proximity of third and fourth conterelectrodes.

18. The method of claim 17 comprising the additional step of operating the third and fourth counterelectrodes at different power levels.

19. The method of claim 1 comprising the additional steps of introducing a first gas into the first treatment chamber and introducing a second gas into the second treatment chamber, the second gas being different from the first gas.

20. The method of claim 19 wherein the first gas is selected from the group consisting of air, oxygen, nitrogen, carbon dioxide, hydrogen, argon, ethylene, and acetone.

21. The method of claim 19 wherein the second gas is selected from the group consisting of air, oxygen, nitrogen, carbon dioxide, hydrogen, argon, ethylene, and acetone.

22. Apparatus for laminating at least two foils such as plastic foils, metal foils and ribbons, paper or fabric, the foils being treated with an electrical gas discharge comprising; (a) a first treatment chamber; (b) means for passing a first foil into the first treatment chamber; (c) first pressure means connected to the first treatment chamber so as to maintain the interior of the first treatment chamber at a first pressure; (d) a second treatment chamber; (e) means for passing a second foil into the second chamber; (f) second pressure means connected to the second treatment chamber so as to maintain the interior of the second chamber at a second pressure; (g) first and second low energy plasma gas discharge means disposed in the first and second treatment chambers, respectively, to treat the first and second foils with a low energy gas discharge such that the surfaces to be bonded together are activated with an energy density of 10 to $10^4$ mWs/cm$^2$; (h) a laminating chamber; (i) means to pass the foils into the laminating chamber; (j) third pressure means connected to the laminating chamber so as to maintain the interior of the laminating chamber at a third pressure; and, (k) bonding means disposed in the laminating chamber to bring the foils into contact with each other under heat and pressure such that they are bonded together.

23. The apparatus of claim 22 wherein the bonding means comprises a pair of laminating rollers defining a nip therebetween, through which the foils pass, the rollers pressing against one another with a pressure of up to 100 N/cm.

24. The apparatus of claim 23 further comprising means to heat the laminating rollers to a temperature between 350° K. and 600° K.

25. The apparatus of claim 22 wherein the first low energy gas discharge means comprises: a first electrode roller around which the first foil passes; first and second counterelectrodes located in close proximity to the surface of the first electrode roller; and, first high frequency generator means connected to the first electrode roller, and the first and second counterelectrodes.

26. The apparatus of claim 25 wherein the first high frequency generator is connected to the electrode and counterelectrodes such that they have half the generator output voltage to ground.

27. The apparatus of claim 25 further comprising means to operate the first counterelectrode at a different power level than the second counterelectrode.

28. The apparatus of claim 25 wherein the second low energy gas discharge means comprises: a second electrode roller around which the second foil passes; third and fourth counterelectrodes located in close proximity to the second electrode roller; and, second high frequency generator means connected to the second electrode roller, and the third and forth counterelectrdoes.

29. The apparatus of claim 28 wherein the second high frequency generator is connected to the electrode and counterelectrodes such that they have half the generator output voltage to ground.

30. The apparatus of claim 28 further comprising means to operate the third counterelectrode at a different power level than the fourth counterelectrode.

31. The apparatus of claim 22 further comprising first means to introduce a first gas into the first treatment chamber adjacent its treatment area, and second means to introduce a second gas into the second treatment chamber adjacent its treatment area.

32. The apparatus of claim 31 wherein the first gas is different from the second gas.

* * * * *